US012558987B2

(12) United States Patent
Callahan et al.

(10) Patent No.: US 12,558,987 B2
(45) Date of Patent: Feb. 24, 2026

(54) SYSTEM AND METHOD FOR ELECTRIC VEHICLE CHARGING CONTROL MANAGEMENT

(71) Applicant: Inventus Holdings, LLC, Juno Beach, FL (US)

(72) Inventors: Ryan Patrick Callahan, Houston, TX (US); Michael J. Haass, Minneapolis, MN (US); Carlos Zada, North Palm Beach, FL (US); Casey O'Keefe, Austin, TX (US)

(73) Assignee: Inventus Holdings, LLC, Juno Beach, FL (US)

( * ) Notice: Subject to any disclaimer, the term of this patent is extended or adjusted under 35 U.S.C. 154(b) by 2 days.

(21) Appl. No.: 18/582,318

(22) Filed: Feb. 20, 2024

(65) Prior Publication Data

US 2025/0262974 A1      Aug. 21, 2025

(51) Int. Cl.
| | |
|---|---|
| *B60L 53/64* | (2019.01) |
| *B60L 53/62* | (2019.01) |
| *B60L 53/66* | (2019.01) |
| *B60L 53/68* | (2019.01) |
| *G06F 9/54* | (2006.01) |
| *G06Q 30/0201* | (2023.01) |

(Continued)

(52) U.S. Cl.
CPC ............. *B60L 53/665* (2019.02); *B60L 53/62* (2019.02); *B60L 53/64* (2019.02); *B60L 53/68* (2019.02); *G06F 9/547* (2013.01); *G06Q 30/0206* (2013.01); *G06Q 30/0284* (2013.01); *G06Q 50/06* (2013.01)

(58) Field of Classification Search
CPC ......... B60L 53/60–53/80; G06Q 10/02; G06Q 50/06
See application file for complete search history.

(56) References Cited

U.S. PATENT DOCUMENTS

| | | | |
|---|---|---|---|
| 9,457,680 | B2 | 10/2016 | Shinzaki et al. |
| 11,413,984 | B2 | 8/2022 | Yang et al. |

(Continued)

OTHER PUBLICATIONS

Visaria, et al, User preferences for EV charging, pricing schemes, and charging infrastructure, Transportation Research Part A: Policy and Practice 165, 2022, pp. 120-143 (Year: 2022).*

(Continued)

*Primary Examiner* — Daniel Vetter
(74) *Attorney, Agent, or Firm* — Fish & Richardson P.C.

(57)                ABSTRACT

Systems and methods are disclosed herein for managing electric vehicle charging control that provide the reduction of the operational cost to charge an electric vehicle by an energy provider and the reduction of load power consumption. In some examples, a charging control unit can include at least one processor, at least one memory, and an energy cost program stored in the memory to provide calculations for one or more optimized charging windows based on the operational cost of providing electricity by the energy provider. The energy cost information can be acquired by performing a day-ahead web scrape of a publicly available energy cost aggregator for the day-ahead settlement point cost of electricity and the market price of electricity. The charging control unit can provide charge control commands to the EV via a vehicle application programming interface.

20 Claims, 4 Drawing Sheets

(51) Int. Cl.
    *G06Q 30/0283*     (2023.01)
    *G06Q 50/06*     (2012.01)

(56)          References Cited

U.S. PATENT DOCUMENTS

| | | | |
|---|---|---|---|
| 2011/0172837 A1* | 7/2011 | Forbes, Jr. | H02J 3/004 |
| | | | 700/291 |
| 2011/0191220 A1* | 8/2011 | Kidston | B60L 3/04 |
| | | | 705/412 |
| 2015/0006343 A1* | 1/2015 | Sako | H02J 13/00 |
| | | | 705/34 |
| 2019/0087759 A1* | 3/2019 | Ravi | B60L 53/665 |
| 2020/0393259 A1* | 12/2020 | Gantt, Jr. | B60L 53/65 |
| 2021/0342958 A1* | 11/2021 | Dobrzynski | B60L 53/63 |
| 2022/0161679 A1* | 5/2022 | Sugimoto | H02J 7/00032 |
| 2022/0188946 A1* | 6/2022 | Moura | G06Q 30/0283 |
| 2022/0194254 A1* | 6/2022 | Gupta | B60L 53/305 |
| 2022/0375006 A1* | 11/2022 | Polania Castro | B60L 53/66 |
| 2023/0084722 A1* | 3/2023 | Logvinov | G01S 19/51 |
| | | | 705/14.67 |
| 2024/0034180 A1* | 2/2024 | Bhimani | B60L 58/13 |
| 2024/0239226 A1* | 7/2024 | Lu | B60L 53/68 |
| 2024/0326646 A1* | 10/2024 | Lu | G06Q 50/40 |

OTHER PUBLICATIONS

Clairand, et al., Smart charging for electric vehicle aggregators considering users' preferences, IEEE Access, vol. 6, 2018, pp. 54624-54635 (Year: 2018).*

Yang, et al., Risk-aware day-ahead scheduling and real-time dispatch for electric vehicle charging, IEEE Transactions on Smart Grid, vol. 5.2, 2017, pp. 693-702 (Year: 2017).*

Zhang, et al., Optimal charging scheduling by pricing for EV charging station with dual charging modes, IEEE Transactions on Intelligent Transportation Systems, vol. 20, No. 9, 2018, pp. 3386-3396 (Year: 2018).*

Wu, et al.: "Optimizing Home Energy Management and Electric Vehicle Charging with Reinforcement Learning"; found on the internet Feb. 20, 2024 at: https://ala2018.cs.universityofgalway.ie/papers/ALA_2018_paper_37.pdf.

* cited by examiner

300

Plug In

- At Home
- Above Min SoC
- Below Max SoC
- 4 Hours Needed to get to Max SoC

| Hour | TOU Rate | Market Price | Charge Control Signal |
|---|---|---|---|
| 6 | $15.25 | $23.27 | |
| 7 | $15.25 | $23.29 | |
| 8 | $15.25 | $21.02 | |
| 9 | $15.25 | $19.64 | |
| 10 | $15.25 | $16.57 | |
| 11 | $15.25 | $14.72 | |
| 12 | $15.25 | $15.01 | |
| 13 | $15.25 | $15.19 | |
| 14 | $15.25 | $15.63 | |
| 15 | $15.25 | $16.43 | |
| 16 | $15.25 | $27.81 | Charge Off |
| 17 | $15.25 | $43.49 | Charge Off |
| 18 | $15.25 | $26.07 | Charge Off |
| 19 | $15.25 | $24.85 | Charge Off |
| 20 | $15.25 | $23.72 | Charge Off |
| 21 | $3.85 | $19.04 | Charge Off |
| 22 | $3.85 | $17.82 | Charge Off |
| 23 | $3.85 | $16.85 | Charge On |
| 0 | $3.85 | $14.11 | Charge On |
| 1 | $3.85 | $14.66 | Charge On |
| 2 | $3.85 | $17.06 | Charge On |
| 3 | $3.85 | $17.94 | Charge Off |
| 4 | $3.85 | $19.47 | Charge Off |
| 5 | $15.25 | $19.89 | Charge Off |

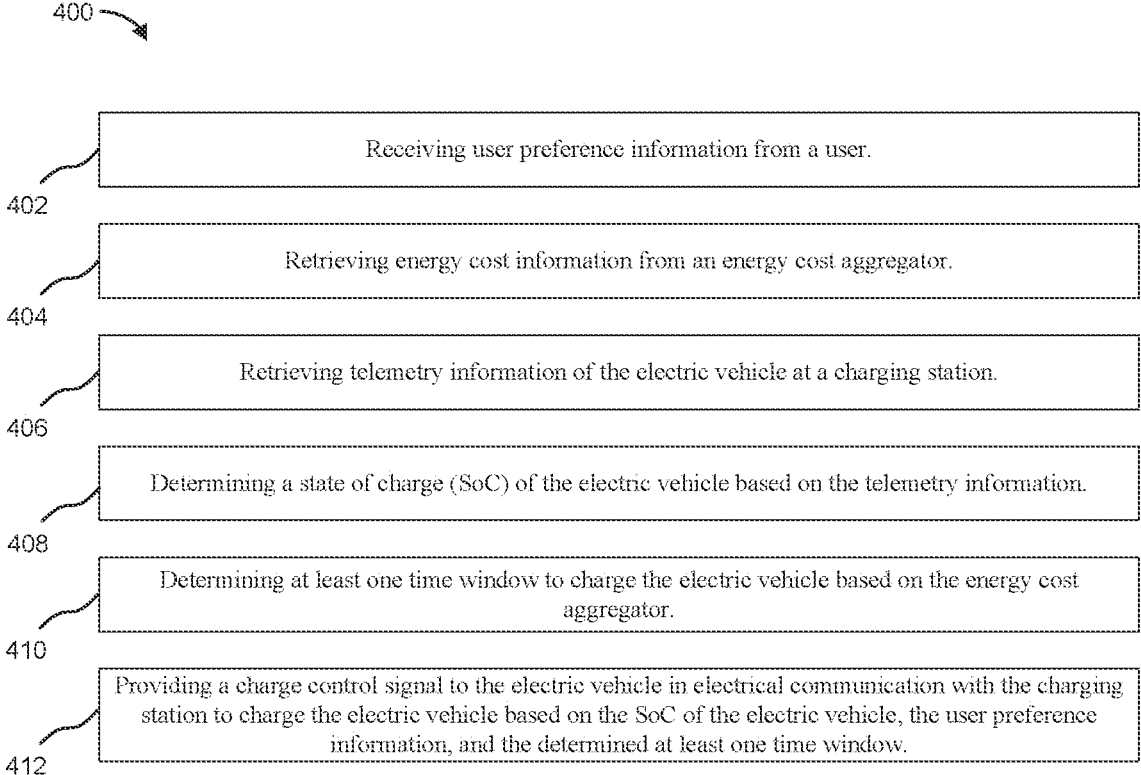

400

402   Receiving user preference information from a user.

404   Retrieving energy cost information from an energy cost aggregator.

406   Retrieving telemetry information of the electric vehicle at a charging station.

408   Determining a state of charge (SoC) of the electric vehicle based on the telemetry information.

410   Determining at least one time window to charge the electric vehicle based on the energy cost aggregator.

412   Providing a charge control signal to the electric vehicle in electrical communication with the charging station to charge the electric vehicle based on the SoC of the electric vehicle, the user preference information, and the determined at least one time window.

FIG. 4

SYSTEM AND METHOD FOR ELECTRIC VEHICLE CHARGING CONTROL MANAGEMENT

TECHNICAL FIELD

The present disclosure relates to systems and methods for electric vehicle charging control management.

BACKGROUND

Electric vehicle (EV) charging can have a large contribution to peak power consumption to a power grid with regards to energy management control. The adoption of renewable energy control strategies rely on accurate system dynamics to be available to a smart grid. Energy management is a core issue for the smart grid and can be beneficial for both the customers and energy providers. The main challenges come from uncertainties on both the power-supply and power-demand sides. EV charging has become one of the major power demands for the residential sector with the fast increase of EV adoption.

SUMMARY

The present disclosure relates to systems and methods for electric vehicle charging control management.

In an example, a system for charging an electric vehicle can include one or more processors. The system for charging the electric vehicle can include a memory. The system for charging the electric vehicle can include one or more programs, wherein the one or more programs are stored in the memory and can include instructions to be executed by the one or more processors. The instructions for charging an electric vehicle can include receiving user preference information from a user via a mobile communication device. The instructions for charging an electric vehicle can include processing a web request to retrieve energy cost information from an energy cost aggregator. The instructions for charging an electric vehicle can include calling a vehicle application programming interface (API) to retrieve telemetry information of the electric vehicle at a charging station. The instructions for charging an electric vehicle can include determining a state of charge (SoC) of the electric vehicle based on the telemetry information. The instructions for charging an electric vehicle can include determining at least one time window to charge the electric vehicle based on the energy cost aggregator. The instructions for charging an electric vehicle can include providing a charge control signal to the electric vehicle in electrical communication with the charging station to charge the electric vehicle based on the SoC of the electric vehicle, the user preference information, and the determined at least one time window.

In yet another example, a method of charging an electric vehicle can include employing at least one processor executing computer executable instructions stored on at least one non-transitory computer readable medium to perform operations. The operations can include receiving, by the processor, user preference information from a user via a mobile communication device. The operations can include processing, by the processor, a web request to retrieve energy cost information from an energy cost aggregator. The operations can include calling, by the processor, a vehicle application programming interface (API) to retrieve telemetry information of the electric vehicle at charging station. The operations can include determining, by the processor, a state of charge (SoC) of the electric vehicle based on the telemetry information. The operations can include determining, by the processor, at least one time window to charge the electric vehicle based on the energy cost aggregator. The operations can include providing, by the processor, a charge control signal to the electric vehicle in electrical communication with the charging station to charge the electric vehicle based on the SoC of the electric vehicle, the user preference information, and the determined at least one time window.

BRIEF DESCRIPTION OF THE DRAWINGS

FIG. 4 is an example of a flow diagram for electric vehicle charging control management.

DETAILED DESCRIPTION

The present disclosure relates to systems and methods for electric vehicle charging control management. As described herein, the electric vehicle (EV) charging control management system is of particular significance with respect to the reduction of the operational cost to provide electric energy by an energy provider and the reduction of load power consumption to charge an electric vehicle. As described herein, the configuration of the EV charging control management system provides improvements against EV charge scheduling based on the consumer price of electricity.

As an example, the EV charging control management system described herein includes one or more processors executing instructions to perform an operation of scheduling the charging of an EV. In one example, a charging control unit can include at least one processor, at least one memory, and an energy cost program stored in the memory to provide calculations for one or more optimized charging windows based on the operational cost of providing electricity by the energy provider (e.g., a utility company, a retail energy provider, etc.) The energy cost information can be acquired by performing a day-ahead web scrape of a publicly available energy cost aggregator for the day-ahead settlement point cost of electricity and the market price of electricity. The charging control unit can provide charge control commands to the EV via a vehicle application programming interface (API). Based on a charging optimization model of vehicle telemetry acquired from the EV via the vehicle API, the charging control unit can communicate to the EV, via the vehicle API, the optimal time of day to draw electric energy from a home charging station.

In an example, an EV user can provide preferences (e.g., minimum state of charge (SoC), maximum SoC, departure time, etc.) via a mobile device. The user preference information can be acquired from the user via a customer API employed by the charging control unit. In one example, additional customer information (e.g., customer premises coordinates, customer premises grid zone, etc.) can be acquired via the customer API in communication with an energy provider server.

In an example, the charging control unit can compile inputs (e.g., current SoC, current plugged in status, current coordinates, customer min/max preferences, customer departure time, Time-Of-Use (TOU) rate, day ahead settlement price in customer zone, historical EV charge rate, etc.) to output one or more optimized charging windows and charge control commands to facilitate charging an EV. In one example, the charging control unit can store EV authentication tokens for communicating charge control commands to the EV.

Figure 1:
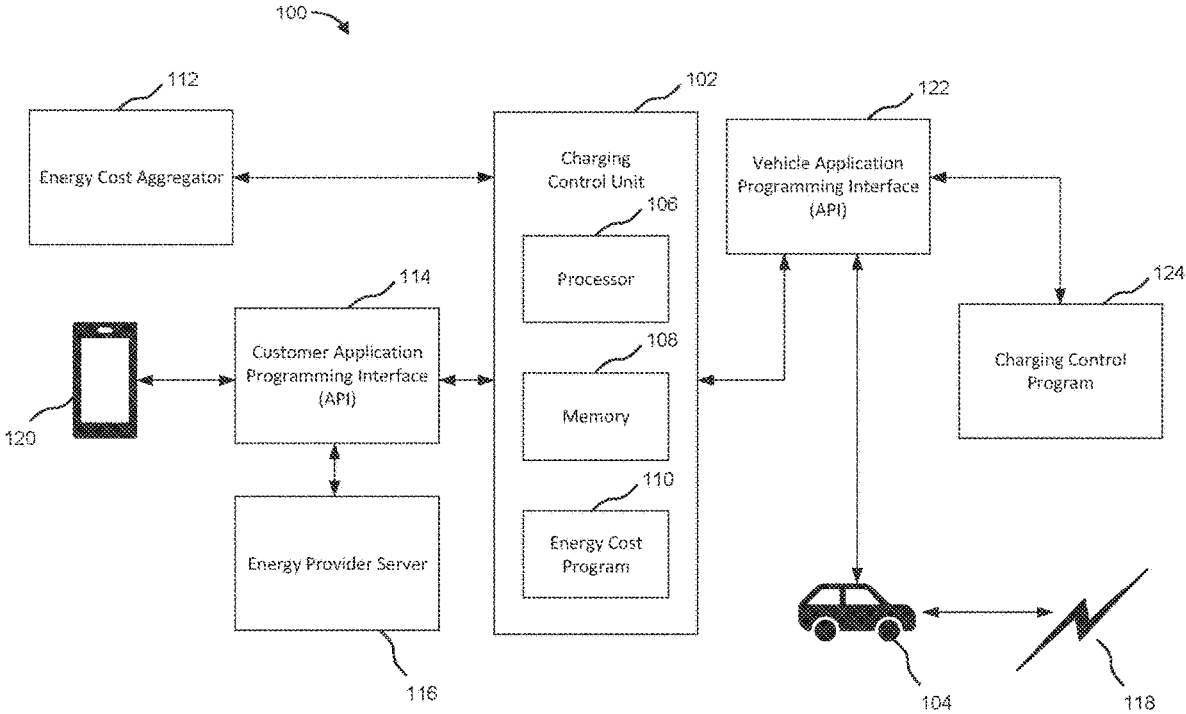
FIG. 1 illustrates a diagram of a system for electric vehicle charging control management.

Referring to FIG. 1, a block diagram of a system for electric vehicle charging control management 100 is depicted. The system includes a charging control unit 102 configured to compile inputs, to calculate one or more optimized windows for charging an EV 104, and to provide a charging signal to the EV 104 during the one or more optimized windows for charging. The charging control unit includes a processor 106, a memory 108, and a energy cost program 110 that can provide instructions for the optimized charging of the EV 104.

The system for electric vehicle charging control management 100 can be configured to determine one or more optimized charging windows by gathering energy cost information from an energy cost aggregator 112. The energy cost aggregator 112 can be a website or other program containing energy cost information (e.g., day ahead settlement price in customer zone, etc.). The charging control unit 102 can be configured to process a web request to retrieve the energy cost information from the energy cost aggregator 112 for information on day ahead analysis of the cost for providing electric energy. The charging control unit 102 can be configured to generate a schedule based on the day ahead cost for providing electric energy to reduce the cost of charging the EV 104 for the energy provider.

In one example, the charging control unit 102 can employ a customer API 114 to obtain information pertaining to the energy customer. The customer API 114 can be in communication with an energy provider server 116 to obtain customer information (e.g., customer premises coordinates, customer premises load zone, customer utility TOU rate, etc.). The customer information can be provided to the charging control unit 102 via the customer API 114. The charging control unit 102 can be configured to utilize the customer information to determine one or more optimal charging windows to charge the EV 104 by determining the load zone and the cost of providing energy to the load zone, whereas the energy customer can charge the EV 104 at the home charging station 118 therein.

In an example, the energy customer can input user preference information (e.g., minimum SoC, maximum SoC, departure time, etc.) into a mobile device 120. The charging control unit 102 can employ the customer API 114 to retrieve the user preference information from the mobile device 118. In another example, the charging control unit 102 can be configured to utilize the user preference information to generate one or more optimized charging windows to charge the EV 104. In one example, the mobile device 120 can include an application that allows the energy customer to adjust the user preference information. The energy customer can utilize the application to grant permission to the charging control unit 102 to utilize data pertaining to the EV 104.

In an example, the charging control unit 102 can employ a vehicle API 122 to obtain telemetry information (e.g., current SoC, current plugged in status, current EV location, historical EV charge rate, etc.) from the EV 104. The telemetry information obtained from the EV 104 can be communicated to the charging control unit 102 by the vehicle API 122 to be utilized in a charging optimization model, as described in FIG. 2 below, that can be processed by the charging control unit 102. In one example, when the EV 104 is plugged into the home charging station 118, the EV can transmit telemetry information periodically (e.g., every minute) via the vehicle API 122 back to the charging control unit 102 for charging commands to be issued until the EV 104 is fully charged or the user preferences are met by the time of the next departure.

In an example, a charging control program 124 can be stored in a memory (not shown) on a unit comprising a processor (not shown) other than the memory and processor of the charging control unit 102. In one example, the unit comprising the charging control program 124 can be run from a different geographic location than the charging control unit 102, whereby the charging control unit 102 and the unit comprising the charging control program 124 can be communicatively coupled via the world wide web. The charging control program 124 can be configured to receive the outputs of the charging control unit 102 via the vehicle API 122. Based on the charging optimization model and the charging schedule generated by the charging control unit 102, the charging control program 124, can issue a charge on or charge off signal via the vehicle API 122 to the EV 104. Upon receiving the charge signal, the EV 104, in electrical communication with the home charging station 118, can begin to attain a charge until the user preferences are satisfied or until a full charge is attained. In one example, the charging control program can be configured to issue the required mode (e.g., fast charge, etc.) to satisfy the necessary charge of the EV 104 based on the outputs of the charging control unit 102 and the user preference information.

In an example, the energy customer can set the user preferences via the mobile device 120 to a minimum SoC. Once the system detects that the EV 104 has been plugged in having a current SoC of less than the minimum SoC, the charging control program 124 can be configured to immediately issue a charge signal to reach the minimum SoC set by the energy customer. In one example, the charging control program 124 can stop the EV 104 from charging past the minimum SoC until an optimized charging window has been reached as determined by the charging control unit 102, whereby the charging control program 124 can issue another charge signal to charge the EV up to the maximum SoC as set by the energy customer or until a full charge is reached.

In another example, the energy customer can set the user preference via the mobile device 120 to a maximum SoC. Once the system detects that the EV 104 is charging and has met the maximum SoC, the charging control program can issue a charge off signal, based on the user preferences. The vehicle API 122 can periodically communicate the current SoC to the charging control unit 102. The current SoC can be communicated to the mobile device 120 via the customer API 114.

The vehicle API 122 can be configured to communicate telemetry information (e.g., battery level, battery range, battery capacity, etc.) of the EV 104 back to the charging control unit 102 during the charge of the EV 104 or while the EV 104 is away from the home charging station 118. The telemetry information can include values that factor into the charging optimization model. In an example, the charging control unit 102 can make determinations based on the telemetry information and communicate the determinations to the charging control program 124 which issues the charge signal to the EV 104 via the vehicle API 122 based on the determinations of the charging control unit 102.

In an example, the charging control unit 102 can be configured to prioritize the minimization of operational costs of the energy provider and the power being drawn to charge the EV 104 in a load zone. The charging control unit 102 generates the charging schedule for the EV 104 based on the energy cost information by the hour for the day ahead. The charging control unit 102 can generate a plurality of charging windows based on the user preferences entered via the mobile device 120 and other contributing factors. However, the charging control unit 102 can be configured to generate an optimized charging window which places priority on reducing the cost of delivering the electricity to charge the EV 104.

In one example, the charging control unit 102 can periodically issue telemetry checks via the vehicle API 122 to retrieve telemetry information regarding the EV 104. In another example, the EV 104 can communicate with the charging control unit 102 via the vehicle API 122 immediately upon being plugged in to the home charging station 118. Once the EV 104 is plugged in to the home charging station 118, the charging control unit 102 can be configured to begin the charging optimization model to determine the logic for charging the EV 104.

In an example, the charging control unit 102 can be configured to determine the charge rate based on the historical at-home charging sessions. In one example, the historical at-home charging sessions can be retrieved from the EV 104 and communicated to the charging control unit 102 via the vehicle API 122. In another example, the historical at-home charging sessions can be retrieved from the charging control program 124 and communicated to the charging control unit 102 via the vehicle API 122.

In an example, the charging control program 124 can periodically check with the charging control unit 102 via the vehicle API 122 to determine whether it is time to issue a charge control signal to the EV 104. The charging control unit 102 can communicate to the charging control program 124 via the vehicle API 122 to hold a no charge signal until a command is issued to send a charge on signal to the EV 104 by the charging control unit 102.

Figure 2:
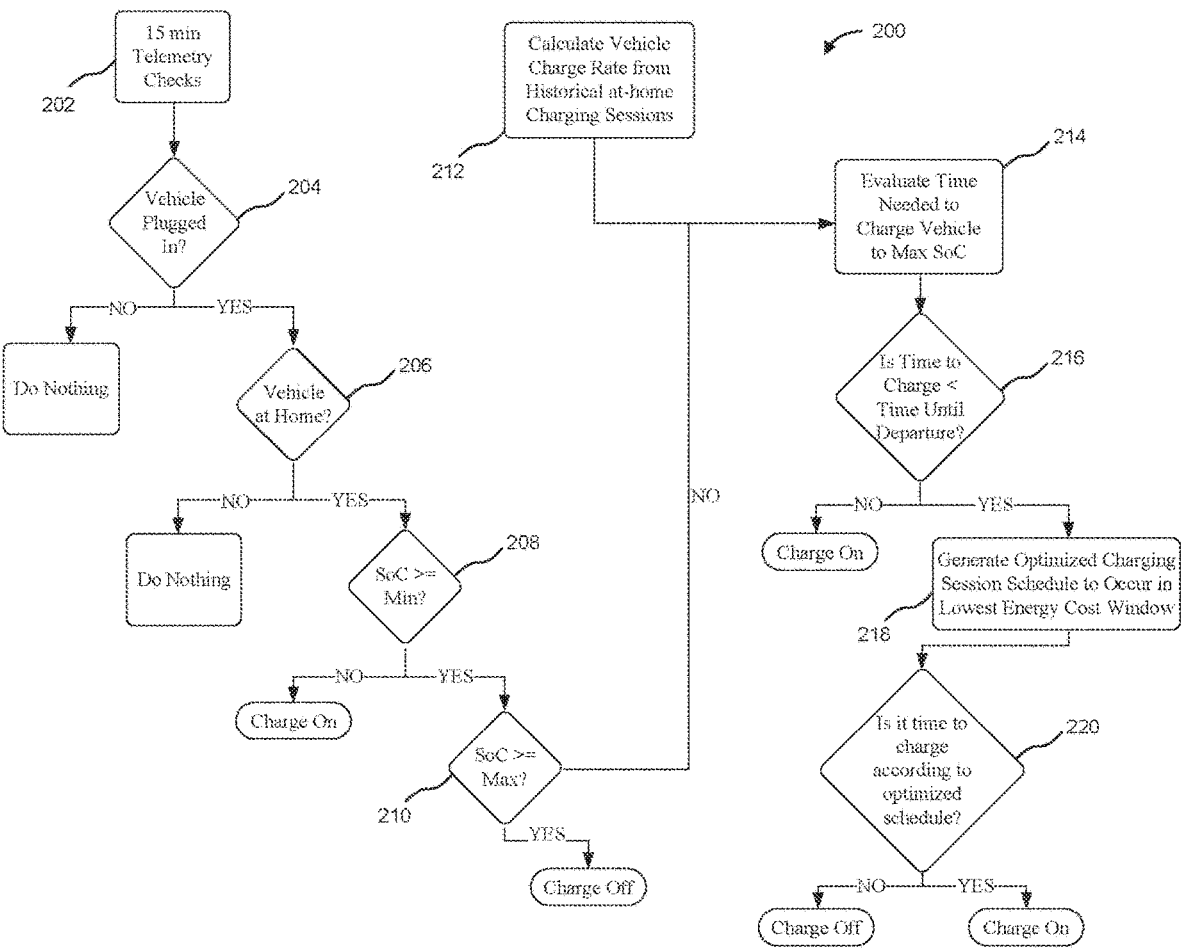
FIG. 2 is an example of a flow chart for a charging optimization model of vehicle telemetry.

Turning now to FIG. 2, a flow chart for a charging optimization model of vehicle telemetry 200 is depicted. The charging optimization model of vehicle telemetry 200 can be logical instructions performed by the system for electric vehicle charging control management 100, as described in FIG. 1 above. In one example, the logical instructions of the charging optimization model of vehicle telemetry 200 can be performed by one or more processors. In another example, each processor can be at a different geographical location than the EV 104 that is being charged.

At 202, a telemetry check can be performed to remotely monitor electrical parameters of the EV 104 in real-time. In an example, telemetry information of the EV 104 can be wirelessly broadcast from the EV 104 to the charging control unit 102 via the vehicle API 122, as described above in FIG. 1. The vehicle API 122 can retrieve telemetry information (e.g., current SoC, current plugged in status, current coordinates, historical EV charge rate, etc.) In one example, the telemetry check can be performed periodically to determine the status of the EV 104 to be charged. The telemetry information gathered from the telemetry check can be used to generate one or more optimized charging windows by the charging control unit 102 based on the charge state of the EV 104 and the user preferences entered by the energy customer via the mobile device 120.

At 204, the vehicle API 122 can determine whether the EV 104 is plugged into a charging station. In an example, the vehicle API 122 can determine whether the EV 104 is plugged into a charging station. If it is determined by the vehicle API 122 that the EV 104 is plugged into a commercial charging station, no changes are necessary to be made and the EV 104 can continue its charge. In one example, when it is determined by the vehicle API 122 that the EV 104 is plugged into a commercial charging station within the same load zone as the home charging station 118, the system

100, as described above in FIG. 1, can be configured to perform the charging operations of the EV 104 whereby the commercial charging station can charge the vehicle based on the operational cost of providing electricity by the energy provider and/or to reduce the load of charging the EV 104 in the load zone. The charging control unit 102 can thereby be configured to adjust the charging mode (e.g., fast charging, etc.) of the EV 104.

At 206, the charging control unit 102 can determine whether the EV 104 has been plugged into the home charging station 118 as defined by the customer information retrieved from the energy provider server 116 via the customer API 114. In an example, the vehicle API 122 can be configured to locate, via a suitable tracking system (e.g., global positioning system, mobile network, etc.), the geographical coordinates of the EV 104. Thereby, the charging control unit 102 can be configured to verify the arrival of the EV 104 at the home charging station 118 by matching the telemetry information of the vehicle API 122 with the customer premises of the customer information as retrieved by the customer API 114. Upon determining by the charging control unit 102 that the EV 104 is not plugged into the home charging station 118, no change is necessary to be made. Upon determining that the EV 104 is plugged into the home charging station 118, the charging control unit 102 can evaluate the telemetry information to determine whether the parameters have been met to charge the EV 104 within one or more optimized charging windows.

At 208, once it has been determined by the vehicle API 122 that the EV 104 is currently plugged into the home charging station 118, the charging control unit 102 can determine whether the current SoC of the EV 104 is greater than or equal to the minimum SoC as set by the energy customer via the mobile device 120. In an example, once it is determined that the EV 104 has a current SoC that is less than the minimum SoC as set via the mobile device 120, the charging control unit 102 can be configured to cause the charging control program 124 to issue a charge on signal until the EV 104 has reached the minimum SoC. In one example, the EV 104 can be provided a charged on signal by the charging control program 124 outside of the one or more optimized charging windows to obtain the minimum SoC to maintain an operational state of the EV 104.

At 210, the vehicle API 122 can determine whether the EV 104 has a current SoC that is less than or equal to the maximum SoC as set by the energy customer via the mobile device 120. In one example, the EV 104 can be plugged in to the home charging station 118, whereby the vehicle API 122 can determine that the EV 104 has a current SoC greater than the maximum SoC setting. Thereby, the charging control program 124 can send a charge off signal to the EV 104. In another example, the EV 104 can be plugged in to the home charging station 118, whereby the vehicle API 122 can determine that the EV 104 has a current SoC less than the maximum SoC setting. The vehicle API 122 can communicate the telemetry information to the charging control unit 102 to determine whether the EV 104 has satisfied the parameters to be issued a charge on signal.

At 212, the charging control unit 102 can be configured to receive telemetry information (e.g., historical EV charge rate) from the EV 104 via the vehicle API 122. The charging control unit 102 can be configured to utilize the historical EV charge rate of the EV 104 and determine a suitable charge rate considering the energy cost information and the current load of electricity in the load zone. In an example, the charging control unit 102 can determine the historical at-home charge rate of the EV 104 by isolating the charging sessions that occur at the home charging station 118. In another example, the charging control unit can isolate the charging sessions of the EV 104 to charging sessions that occurred within the same load zone of the home charging station 118 to evaluate the charge rate based on the electricity usage within the load zone.

At 214, the charging control unit 102 can be configured to evaluate the time needed to charge the EV to the maximum SoC, based on the user preference information as set by the energy customer via the mobile device 120. In an example, the charging control unit 102 can reevaluate the time needed to charge the vehicle to a maximum SoC, based on a change in the charging mode (e.g., fast charging) which can be triggered by a change in the electrical load on the load zone. In another example, the charging control unit 102 can change the charging mode to achieve the determined time needed to charge the EV 104 to the maximum SoC.

At 216, the charging control unit 102 can determine whether the EV 104 has a current SoC that is less than the maximum SoC. In an example, the charging control unit 102 has determined that the time to charge the EV 104 is not less than the time until departure, whereby the charging control unit 102 can instruct the charging control program 124 to issue a charge on signal to the EV 104 to provide a continuous charge towards the maximum SoC by the scheduled departure time. In another example, the charging control unit 102 has determined that the time to charge is less than the time to departure, whereby the charging control unit 102 can be configured to gather additional telemetry information for the EV 104 via the vehicle API 122. In one example, the charging control unit 102 can be configured to check the status of the electricity supplied to the load zone, whereby the customer API 114 can be called to perform a status check of the load zone from the energy provider server 116 to determine whether an adjustment can be made to the charging mode of the EV 104 to decrease the time to charge the EV 104.

At 218, the charging control unit 102 can be configured to generate a data table comprising an optimized charging schedule consisting of one or more optimized charging windows. In one example, the optimized charging window of the optimized charging schedule can be based on the periods throughout the day in which the lowest cost for providing electric energy to the energy customer can be achieved by the energy provider. In an example, the one or more optimized charging windows can be generated by scraping the energy cost aggregator 112 website for day ahead energy service costs to the energy provider. Generating the optimized charging window will be discussed in further detail below in FIG. 3. In one example, the one or more charging windows can be generated periodically (e.g., daily) to determine the most cost efficient time to charge the EV 104 for the following day.

At 220, the charging control unit 102 can be configured to determine whether it is time to charge the EV 104 based on the optimized charging schedule. In one example, the charging control unit 102 can determine that the present hour is an hour that the generated optimized charging schedule has determined to be outside of the optimized charging window, whereby the charging control program 124 can send a charge off signal to the EV 104. In another example, the charging control unit 102 can be configured to identify that the present hour falls within an optimized charging window of the optimized charging schedule, whereby the charging control program 124 can send a charge on signal to the EV 104. In one example, the EV 104 can communicate to the home charging station 118 to supply electrical energy to charge the battery of the EV 104.

Figure 3:
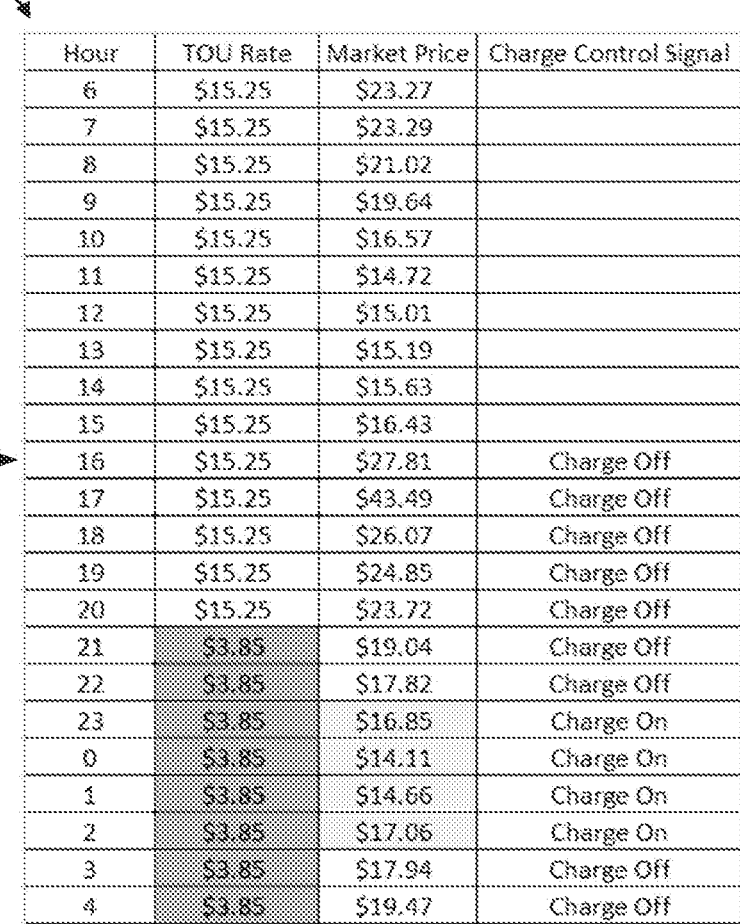
FIG. 3 is an example of an optimized charging schedule.

Turning now to FIG. 3, an example of an optimized charging schedule 300 is depicted. In one example, data obtained from the energy cost aggregator 112 can be compiled in an hourly breakdown of economic details with regards to the cost and price of energy provided in a load zone of the electric grid. In an example, the charging control unit 102 can be configured to extract raw data from the energy cost aggregator 112 in a web scraping operation. In another example, the charging control unit 102 can utilize the raw data extracted from the energy cost aggregator 112 to generate a data table of day ahead energy market information, whereby a charging signal can be appended to each record of the data table to determine the optimal hours to charge the EV 104.

In an example, the optimized charging schedule 300 can utilize an identifier field (e.g., an integer) for each record representing a period of the day that electric energy can be supplied to an energy customer by an energy provider for charging the EV 104. In one example, an electric energy cost field (not shown) can be appended to each record of the optimized charging schedule 300 to indicate the cost of providing the energy to the energy customer. In an example, the first record of the optimized charging schedule 300 can indicate the period of the day in which rush hour traffic often begins, whereby the departure time as set by the energy customer via the mobile device 120 most often occurs. In another example, the EV 104 can be expected to return to the home charging station 118 around the 1600 hour, whereby the optimized charging schedule populates a charge signal to records indicating periods when the EV 104 can be likely to be present.

In an example, the charging control unit 102 can identify at least one optimized charging window based on the hours of the day within which optimized charging of the EV 104 can occur. In one example, the charging control unit 102 can obtain a time-of-use rate that can be a price adjustment based on the time of day that aligns with electrical grid demands. The change in the time-of-use rate can provide an indication to the charging control unit 102 that an optimized charging window can begin upon the decrease of the time-of-use rate, whereby ending upon the increase of the time of use rate. In one example, the charging control unit 102 can identify that the optimized charging window will last for 8 hours, whereby the charging control unit 102 can utilize this information to determine that there is enough time to charge the EV 104 to the maximum SoC as set by the energy customer via the mobile device 120.

For the sake of brevity, a market price is provided in the optimized charging schedule 300 due to the number of suppliers and the variability of the cost of providing the electric energy. In one example, the charging control unit 102 can generate a day-ahead optimized charging schedule for each supplier available to the energy provider. In an example, the charging control unit 102 can be configured to identify a batch of continuous records within the optimized charging window representative of hours needed to charge the EV 104 to the maximum SoC based on the lowest cost of providing the electric energy to the energy customer. By identifying the lowest cost of providing the electric energy to the energy customer within an optimized charging window, the energy provider can provide an enhanced account for the environmental effect of the system for electric vehicle charging control management 100.

In an example, as stated above, the charging control unit 102 can be configured to append a charge signal (e.g., charge on, charge off) to a record of the optimized charging schedule 300 at an hour that the EV 104 can be expected to be in the presence of the home charging station. In one example, the charging control unit 102 can assign a charge off signal to a record comprising hours of the day that do not occur within an optimized charging window and records that do not comprise the lowest cost available for providing the electric energy to the energy customer for charging the EV 104 that do occur within the optimized charging window. In another example, the charging control unit 102 can assign a charge on signal to a record comprising hours of the day that include the lowest cost available for providing the electric energy to the energy customer for charging the EV 104. The charge signal provided in the optimized charging schedule 300 can be utilized to instruct the charging control program 124 to communicate with the EV 104 to begin an optimized charging session.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they make various changes, substitutions, alterations herein without departing from the spirit and scope of the present disclosure.

Referring now to the example of FIG. 4, illustrated is a flow diagram 400 for charging an electric vehicle in accordance with one or more examples described herein.

At 402, the flow diagram comprising receiving user preference information from a user via a mobile communication device.

At 404, the flow diagram comprises processing a web request to retrieve energy cost information from an energy cost aggregator.

At 406, the flow diagram comprises calling a vehicle application programming interface (API) to retrieve telemetry information of the electric vehicle at a charging station.

At 408, the flow diagram comprises determining a state of charge (SoC) of the electric vehicle based on the telemetry information.

At 410, the flow diagram comprises determining at least one time window to charge the electric vehicle based on the energy cost aggregator.

At 412, the flow diagram comprises providing a charge control signal to the electric vehicle in electrical communication with the charging station to charge the electric vehicle based on the SoC of the electric vehicle, the user preference information, and the determined at least one time window.

The charging of the electric vehicle further includes calling a customer API to retrieve customer information for the user from an energy provider server.

The charging of the electric vehicle further includes determining the electric vehicle is connected to the charging station at a home location of the user based on the customer information retrieved from the energy provider server.

The charging of the electric vehicle further includes utilizing the customer information to determine a geographic load zone, wherein the cost of providing energy is based on the geographic load zone.

The charging of the electric vehicle further includes generating an optimized charging schedule, wherein the at least one time window to charge the electric vehicle is configured based on the cost of providing energy in the geographic load zone.

The charging of the electric vehicle further includes providing a charging control signal to the electric vehicle within the at least one time window, wherein a charge on signal occurs in a lowest energy cost window, and wherein a charge off signal occurs outside of the lowest energy cost window.

The charging of the electric vehicle further includes calculating a vehicle charge rate based on historical at-home charging sessions.

The charging of the electric vehicle further includes evaluating a period of time to charge the electric vehicle to a maximum SoC based on the user preference information.

The charging of the electric vehicle further includes determining that the period of time to charge the electric vehicle to the maximum SoC is less than or equal to the time until the electric vehicle is scheduled to depart a home location based on the user preference information.

The charging of the electric vehicle further includes providing a charge on signal to the electric vehicle to obtain a minimum SoC of the electric vehicle upon arriving at a home location.

The above description includes non-limiting aspects of the various examples. It is, of course, not possible to describe every conceivable combination of components or methods for purposes of describing the disclosed subject matter, and one skilled in the art may recognize that further combinations and permutations of various examples are possible. The disclosed subject matter is intended to embrace all such alterations, modifications, and variations that fall within the spirit of the appended claims.

With regard to the various functions performed by the above described components, the terms (including a reference to a "means") used to describe such components are intended to also include, unless otherwise indicated, any structure(s) which performs the specified function of the described component (e.g., functional equivalent), even if not structurally equivalent to the disclosed structure. In addition, while a particular feature of the disclosed subject matter may have been disclosed with respect to only one of several implementations, such a feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited to such examples. In addition, any aspect or design described herein as "exemplary" and/or "demonstrative" is not necessarily to be construed as preferred or advantageous over the other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The description of illustrated examples of the subject disclosure as provided herein, including what is described in the Abstract, is not intended to be exhaustive or to limit the disclosed examples to the precise forms disclosed. While specific examples are described herein for illustrative purposes, various modifications are possible that are considered within the scope of such examples, as one skilled in the art can recognize. In this regard, while the subject matter has been described herein in connection with various examples and corresponding drawings, where applicable, it is to be understood that other similar examples can be used or modifications and additions can be made to the described examples for performing the same, similar, alternative, or substitute function of the disclosed subject matter without deviating therefrom. Therefore, the disclosed subject matter should not be limited to any single example described herein, but rather should be construed in breadth and scope in accordance with the appended claims below.

What is claimed is:

1. A system for charging an electric vehicle, comprising:
one or more processors;
a memory; and
one or more programs, wherein the one or more programs are stored in the memory and configured to be executed by the one or more processors, the one or more programs including instructions for:
receiving user preference information from a user via a mobile communication device, wherein the user preference information includes a maximum state of charge (SoC) and a home location of the user;
processing a web request to retrieve energy cost information from an energy cost aggregator, wherein the energy cost information includes an hourly breakdown of day-ahead settlement point cost of electricity and a market price of energy provided to the user in a load zone of the electric grid, wherein the load zone is based on the home location;
retrieving telemetry information of the electric vehicle in computer communication with a charging station;
determining a current SoC of the electric vehicle based on the telemetry information;
determining a time window to charge the electric vehicle based on the energy cost information and a time period needed to charge the electric vehicle to the maximum SOC;
identifying the charging station as being at a commercial location in the load zone based on the telemetry information;
causing the electric vehicle to charge based on a charge control signal to the electric vehicle in electrical communication with the charging station based on the current SoC of the electric vehicle and the user preference information during the time window for a charging mode;
updating the window by reevaluating the time needed to charge the electric vehicle based on a change in an electrical load on the load zone; and
adjusting the charging mode based on the updated window.

2. The system of claim 1, wherein the instructions further include retrieving customer information for the user from an energy provider server.

3. The system of claim 2, wherein the instructions further include determining the electric vehicle is physically connected to the charging station at the commercial location of the user based on the customer information retrieved from the energy provider server.

4. The system of claim 1, wherein the instructions include utilizing the home location to determine a geographic load zone.

5. The system of claim 1, wherein a charge on signal occurs in a lowest energy cost window, and wherein a charge off signal occurs outside of the lowest energy cost window.

6. The system of claim 1, wherein the instructions include calculating a vehicle charge rate based on historical at-home charging sessions.

7. The system of claim 1, wherein the instructions include evaluating the time period to charge the electric vehicle to the maximum SoC based on the user preference information.

8. The system of claim 7, wherein the instructions include determining that the time period to charge the electric vehicle to the maximum SoC is less than or equal to the time until the electric vehicle is scheduled to depart the commercial location based on the user preference information.

9. The system of claim 1, wherein the instructions include providing a charge on signal to the electric vehicle to obtain a minimum SoC of the electric vehicle upon arriving at the charging station.

10. The system of claim 1, wherein the updated window is determined to reduce the electrical load of charging the electric vehicle in the load zone.

11. A method of charging an electric vehicle, comprising:
employing at least one processor executing computer executable instructions stored on at least one non-transitory computer readable medium to perform operations comprising:
receiving user preference information from a user via a mobile communication device, wherein the user preference information includes a maximum state of charge (SoC) and a home location of the user;
processing a web request to retrieve energy cost information from an energy cost aggregator, wherein the energy cost information includes an hourly breakdown of day-ahead settlement point cost of electricity and a market price of energy provided to the user in a load zone of the electric grid, wherein the load zone is based on the home location;
retrieving telemetry information of the electric vehicle in computer communication with a charging station;
determining a current SoC of the electric vehicle based on the telemetry information;
determining at least one time window to charge the electric vehicle based on the energy cost information and a time period needed to charge the electric vehicle to the maximum state of charge;
identifying the charging station as being at a commercial location in the load zone based on the telemetry information;
causing the electric vehicle to charge based on a charge control signal to the electric vehicle in electrical communication with the charging station based on the current SoC of the electric vehicle and the user preference information during the time window for a charging mode;
updating the window by reevaluating the time needed to charge the electric vehicle based on a change in an electrical load on the load zone; and
adjusting the charging mode based on the updated window.

12. The method of claim 11, further comprising:
retrieving customer information for the user from an energy provider server.

13. The method of claim 12, wherein the operations include determining the electric vehicle is physically connected to the charging station at the commercial location of the user based on the customer information retrieved from the energy provider server.

14. The method of claim 13, wherein the operations include utilizing the home location to determine a geographic load zone.

15. The method of claim 11, wherein the operations include generating an optimized charging schedule, wherein the time window to charge the electric vehicle is configured based on the day-ahead settlement point cost of providing energy in the load zone.

16. The method of claim 15, wherein the operations include providing a charging control signal to the electric vehicle within the time window, wherein a charge on signal occurs in a lowest energy cost window, and wherein a charge off signal occurs outside of the lowest energy cost window.

17. The method of claim 11, further comprising:

calculating a vehicle charge rate based on historical at-home charging sessions.

18. The method of claim 11, further comprising:

evaluating the time period to charge the electric vehicle to the maximum SoC based on the user preference information.

19. The method of claim 18, wherein the operations include determining that the time period to charge the electric vehicle to the maximum SoC is less than or equal to the time until the electric vehicle is scheduled to depart the charging station based on the user preference information.

20. The method of claim 11, further comprising:

providing a charge on signal to the electric vehicle to obtain a minimum SoC of the electric vehicle upon arriving at the charging station.

* * * * *